(12) United States Patent
Limaye et al.

(10) Patent No.: US 7,896,292 B2
(45) Date of Patent: Mar. 1, 2011

(54) REACTIVE COMPONENT REDUCTION SYSTEM AND METHODS FOR THE USE THEREOF

(75) Inventors: Santosh Y. Limaye, El Cajon, CA (US); Donald Koenig, San Diego, CA (US); Wesley Jung, San Diego, CA (US); Stuart Robertson, El Cajon, CA (US)

(73) Assignee: Phyre Technologies, Inc., El Cajon, CA (US)

( * ) Notice: Subject to any disclaimer, the term of this patent is extended or adjusted under 35 U.S.C. 154(b) by 454 days.

(21) Appl. No.: 12/015,452

(22) Filed: Jan. 16, 2008

(65) Prior Publication Data

US 2009/0227034 A1 Sep. 10, 2009

(51) Int. Cl.
*B01J 7/00* (2006.01)
*B01J 19/14* (2006.01)
*B64D 37/32* (2006.01)

(52) U.S. Cl. .................. 244/135 R; 422/204; 422/129; 422/101; 423/210; 423/219; 204/157.3

(58) Field of Classification Search .................. 422/204, 422/129, 101; 244/135; 423/210, 219; 204/157.3
See application file for complete search history.

(56) References Cited

U.S. PATENT DOCUMENTS

| | | | | |
|---|---|---|---|---|
| 3,847,298 A | * | 11/1974 | Hamilton | 220/88.3 |
| 4,556,180 A | * | 12/1985 | Manatt | 244/135 R |
| 5,207,734 A | | 5/1993 | Day et al. | |
| 6,463,889 B2 | | 10/2002 | Reddy | |
| 6,585,192 B2 | * | 7/2003 | Beers | 244/135 R |
| 6,843,269 B2 | * | 1/2005 | Verma et al. | 137/209 |
| 7,694,916 B2 | * | 4/2010 | Limaye et al. | 244/135 R |
| 7,735,670 B2 | * | 6/2010 | Zaki et al. | 220/88.3 |
| 2006/0113248 A1 | | 6/2006 | Koenig et al. | |

FOREIGN PATENT DOCUMENTS

WO WO 2006/076649 7/2006
WO WO 2007/008730 1/2007

OTHER PUBLICATIONS

International Search Report for PCT Patent Application No. PCT/US2009/030226.

* cited by examiner

*Primary Examiner* — Brian J Sines
(74) *Attorney, Agent, or Firm* — Foley & Lardner LLP; Stephen E. Reiter

(57) ABSTRACT

In accordance with the present invention, there are provided simplified systems and methods for catalytically deactivating, removing, or reducing the levels of reactive component(s) from the vapor phase of fuel storage tanks. The simple apparatus described herein can be utilized to replace complex systems on the market. Simply stated, in one embodiment of the invention, the vapor phase from the fuel tank is passed over a catalytic bed operated at appropriate temperatures to allow the reaction between free oxygen and the fuel vapor by oxidation of the fuel vapor, thus deactivating reactive component(s) in the gas phase.

44 Claims, 12 Drawing Sheets

REACTIVE COMPONENT REDUCTION SYSTEM AND METHODS FOR THE USE THEREOF

FIELD OF THE INVENTION

The present invention relates to the field of reactive component removal systems (e.g., on board reactive component removal systems), and reaction systems and methods for the removal of reactive components from vapor phase fluid prior to the introduction thereof into fuel- or liquid chemical-containing vessels (e.g., vessels employed for fuel, flammable liquid or reactive liquid storage and/or transport). In a particular aspect, the invention relates to systems and methods for the catalytic removal of reactive components (specifically oxygen and/or fuel vapors) from the vapor phase fluid prior to the introduction thereof into fuel containing vessels (e.g., vessels employed for storage and/or transport), thereby reducing the potential for fire and explosion in such vessels.

BACKGROUND OF THE INVENTION

In order to avoid the potential fire and explosion hazard in storage and/or transport vessels containing fuel, flammable liquid or reactive liquid (e.g., aircraft fuel tanks, ships carrying flammable fluids as cargo, stationary storage tanks, and the like), it is necessary to reduce the concentration of reactive components (e.g., oxygen and/or fuel vapors) in the gas phase that may be brought into contact with liquid fuel. Many different approaches have been taken in efforts to address this problem. One such approach, for example, involves the use of a membrane-based gas separator to remove a sufficient amount of oxygen from the fluid stream which is to be introduced into the fuel-containing vessel so as to reduce the oxygen concentration below 5%. This reduced oxygen content gas is then used as an inert gas blanket in the storage vessel.

Another method employed in the art involves use of a pressure swing adsorption system to separate the oxygen from air to generate oxygen depleted inert gas for introduction into the storage vessel.

These as well as other systems described in the prior art require elaborate setup and add significantly to the cost of operation. Accordingly, there is a need for improved systems and methods for removing reactive components (e.g., oxygen and/or fuel vapors), or reducing the levels thereof, from the vapor phase of fuel storage vessels.

SUMMARY OF THE INVENTION

In accordance with the present invention, there are provided simplified systems and methods for reducing the concentration of one or more reactive component(s) in vapor phase fluids introduced into the void space of storage vessels. The simple apparatus described herein can be utilized to replace complex systems on the market. Simply stated, in one embodiment of the invention, the vapor phase from the fuel tank is analyzed to determine if the level of reactive component(s) therein warrants treatment to reduce the risk of self-ignition; and, if warranted, the vapor phase is passed over a catalytic bed operated at appropriate temperatures to allow the reaction between free oxygen and the fuel vapor by oxidation of the fuel vapor, thus deactivating reactive components in the gas phase. In addition, circulation and treatment of vapors as contemplated herein minimizes the venting of fuel-containing vapors to the atmosphere.

In another embodiment of the present invention, there are provided systems for determining whether treatment is warranted to deactivate, reduce the concentration of, or remove one or more reactive components (e.g., oxygen and/or fuel vapors) from the vapor phase of a fuel storage tank, and, if such treatment is warranted, means to accomplish same. Invention systems include a reaction zone having an inlet and outlet (wherein the reaction zone provides conditions suitable to deactivate the reactive components), at least one sensor (which is capable of analyzing the concentration of reactive component(s) in the vapor phase, the concentration of combustible material in the vapor phase, and/or the flow rate of the vapor phase), and a flow control element (which is capable of controlling the flow rate of the vapor phase through said system, and/or directing all or a portion of the fluid to the inlet of said fluid treating zone or all or a portion of the fluid back into the container, based on the analysis provided by the sensor). Optionally, inventive systems include the ability to remove heat and or water from the vapor phase.

In yet another embodiment of the present invention, there are provided fuel storage systems for use in a storage and/or transport vessel (e.g., an aircraft, a ship carrying flammable fluids as cargo, a stationary storage tank, and the like), such fuel storage systems being capable of maintaining the concentration levels of one or more reactive components in the vapor phase of the fuel storage tank at sufficiently low levels so as to dramatically reduce the risk of fire and explosion therefrom. Moreover, circulation and treatment of vapors as contemplated herein minimizes the venting of fuel-containing vapors to the atmosphere.

In still another embodiment of the present invention, there are provided methods for determining whether treatment is required of a vapor phase fluid which potentially contains one or more reactive component(s) therein prior to introduction thereof into a container having fuel therein, and if such treatment is required, reducing the concentration of said one or more reactive component(s) in said vapor phase fluid prior to introduction thereof into said container sufficiently so as to reduce the concentration of reactive component(s) in said vapor phase fluid below the concentration at which auto-ignition may occur when said vapor phase fluid is introduced into said container. If treatment is warranted, the invention further provides methods for deactivating, reducing the concentration of, or removing one or more reactive components from the vapor phase of a fuel storage tank. Invention methods comprise contacting at least a portion of the vapor phase from the fuel storage tank with a sensor (which is capable of analyzing the concentration of reactive component(s) in the vapor phase, the concentration of combustible material in the vapor phase, and/or the flow rate of the vapor phase), and then to a flow control element (which is capable of controlling the flow rate of the vapor phase through said system, and/or directing all or a portion of the fluid to the inlet of a fluid treating zone or all or a portion of the fluid back into the container, based on the analysis provided by the sensor). The fluid treating zone comprises a reaction zone which serves to deactivate the reactive components before the vapor phase is returned to the fuel storage tank. Optionally, inventive methods include the ability to remove heat and/or water from the vapor phase.

DETAILED DESCRIPTION OF THE PREFERRED EMBODIMENTS

Figure 1:
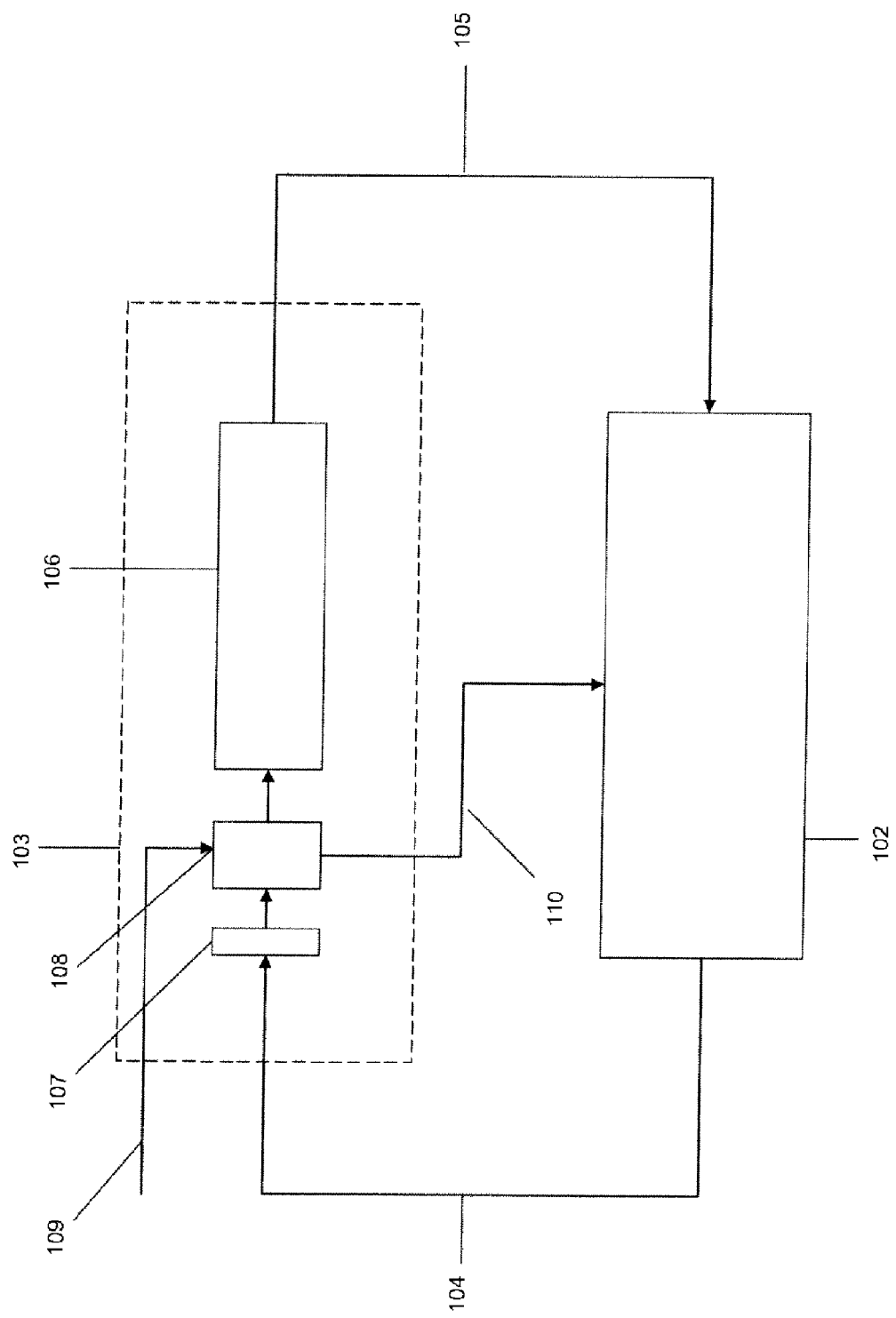
FIG. 1 is a schematic illustration of one embodiment of a reactive component reduction system according to the invention.

In accordance with the present invention, there are provided systems for reducing the concentration of one or more reactive component(s) in the vapor space of a container having combustible material therein, thereby reducing the concentration of reactive component(s) in said vapor space below the concentration at which auto-ignition may occur. Invention systems comprise:
 a storage container capable of storing combustible material therein,
 a fluid treating zone comprising:
  at least one inlet,
  at least one outlet, and
  a reaction zone, wherein said reaction zone provides conditions suitable to deactivate said one or more reactive component(s) when contacted therewith,
 at least one sensor for
  (a) analysis of the concentration of reactive component(s) in the vapor phase,
  (b) analysis of the concentration of combustible material in the vapor phase, and/or
  (c) analysis of the flow rate of the vapor phase, and
 a flow control element,
wherein:
 the vapor space of said container is in fluid communication with said sensor;
 the sensor is in fluid communication with said flow control element;
 the flow control element is capable of controlling the flow rate of the vapor phase through said system, and/or directing all or a portion of the fluid to the inlet of said fluid treating zone or all or a portion of the fluid back into the container; and
 the outlet of said fluid treating zone is in fluid communication with the container.

As readily recognized by those of skill in the art, there are a variety of reactive components which one may desirably wish to remove (or reduce the concentration of) when in contact with combustible materials (such as fuel oil, diesel, jet fuel, marine fuel, and the like). One reactive component contemplated for treatment in accordance with the present invention is oxygen. Another reactive component contemplated for treatment in accordance with the present invention may also include fuel vapor, as well as a variety of additives and/or impurities commonly associated therewith. A particular advantage of the present invention relates to the fact that circulation and treatment of vapors as contemplated herein minimizes the venting of fuel-containing vapors to the atmosphere, thereby reducing the environmental impact caused by the handling of such materials.

Invention systems optionally comprise an inlet/outlet which enables equilibration of pressure within the vessel depending on whether the vessel is exposed to sub- or super-atmospheric conditions. For example, it may be desirable to provide a source of make-up gas to equilibrate pressure within the system upon exposure to sub-atmospheric conditions. Alternatively, upon exposure to super-atmospheric conditions, it may be desirable to allow venting of the vessel to reduce the pressure therein. For example, upon ascent or descent of an aircraft, pressures within the aircraft, including fuel storage vessels therein, may vary significantly. In the case of descent, for example, it may be desirable to supplement the gas content of the vessel. Conversely, upon ascent of an aircraft, it may be desirable to relieve excess pressure on the fuel storage vessel. Optionally, make-up gas (or vented vapors) will be subjected to the invention method for deactivating one or more reactive component(s) therein (e.g., by reducing the concentration thereof) so as to reduce the safety hazards associated with the introduction of outside air into the system, or the venting of vapors to the atmosphere.

Invention systems may optionally be configured as closed loop systems. As employed herein, the term "closed loop" refers to the fact that the vapor having been treated to deactivate the reactive components therein is returned to the fuel storage vessel, rather than being vented. It is to be understood, however, that invention closed loop systems still contemplate the presence of one or more inlets/outlets for such purposes as equilibration of pressure therein, removal of water vapor or other components therefrom, and the like. The reaction zone contemplated for use in the practice of the present invention can be configured in a variety of ways, e.g., the reaction zone may comprise a vessel containing catalyst, wherein said catalyst is reactive with said one or more reactive component(s) when contacted therewith under suitable conditions. In some embodiments, the vessel has an inlet end and an outlet end, and catalyst content can vary throughout the vessel. In certain other embodiments the catalyst content can increase from the inlet end to the outlet end of the vessel.

As employed herein, "deactivate" refers to the conversion of reactive components such as oxygen, fuel vapor, and the like, into substantially non-reactive species, i.e., species that are substantially inert under the conditions to which they are exposed. Preferably, deactivated species are non-flammable.

In one aspect of the present invention, reaction zones contemplated for use in the practice of the present invention comprise a catalyst which facilitates conversion of reactive component(s) to non-reactive component(s) when contacted therewith under suitable conditions. In one embodiment, catalyst can be contained within a vessel. When catalyst contemplated for use herein is contained in a vessel, the vessel can be equipped with an inlet end and an outlet end. In one aspect, the catalyst content can vary from the inlet end to the outlet end. In one aspect, the catalyst content can vary non-linearly from the inlet end to the outlet end, e.g., in one aspect, the catalyst content can increase from the inlet end to the outlet end. Alternatively, the catalyst content can decrease from the inlet end to the outlet end.

Alternatively, catalyst need not be contained within a vessel, instead existing in a form which allows passage of vapor phase fluid therethrough, or where the catalyst is supported in such a way that a separate vessel to contain the catalyst is not necessary.

Catalysts contemplated for use in the practice of the present invention include optionally supported metal catalysts, such as, for example, noble metals (e.g., platinum, palladium, gold, silver, and the like), precious metals, transition metals, metal oxides, rare earth oxides, nitrides, carbides, enzymes, and the like, as well as mixtures of any two or more thereof. "Catalytic" refers to facilitating a reaction or interaction involving one or more reactants. Catalytic materials may include noble metals, transition metals, metal oxides (e.g., transition metal oxides such as RuOx, LaMnOx and peravskites), and the like, as well as various combinations thereof.

Catalytic materials contemplated for use herein may optionally be supported on a variety of materials, such as for example, metallic supports, activated carbon, carbon black, and the like, as well as mixtures thereof. Inorganic oxides may also be employed as support materials, either alone or in combination, e.g., silica, alumina, silica-alumina, magnesia, titania, zirconia, montmorillonite, and the like, or combinations thereof, for example, silica-chromium, silica-titania, and the like.

When catalytic treatment of reactive components is employed, a wide variety of suitable conditions for contacting said catalyst with said one or more reactive component(s) are contemplated. Exemplary conditions comprise contacting the vapor phase materials with catalyst at a temperature in the range of about 25° C. up to about 1200° C. Presently preferred temperatures contemplated for use herein range from about 50° C. up to about 400° C. Even more preferred are temperatures ranging from about 100° C. up to about 350° C.

To facilitate control of the above-described catalytic process, invention systems can optionally further comprise a temperature modulator. Optionally, the temperature modulator can be a heat exchanger, which may include a heat exchange medium. The heat exchange medium can optionally include a liquid or external air. Optionally, heat exchange can be accomplished by evaporative cooling. As another alternative, heat exchange can be accomplished with a heat pump, an evaporative cooler, or the like.

The heat exchanger can be positioned in a variety of locations within the invention system, e.g. the heat exchanger can be associated with the catalyst containing vessel; or the heat exchanger can be positioned upstream or downstream from the catalyst containing vessel: or the heat exchanger may be integrated with the catalyst vessel.

When the temperature modulator is positioned upstream of the catalyst containing vessel, it is preferably used to pre-heat either the fuel vapor, air, or a mixture thereof. When the temperature modulator is positioned downstream of the catalyst containing vessel, it is preferably used to reduce the temperature of the vapor exiting the catalyst containing vessel. When the temperature modulator is associated with the catalyst containing vessel, it can be used to heat or cool the reaction vessel, as necessary, to provide conditions suitable for catalyzing reaction of oxygen with fuel vapor, thereby deactivating reactive components (e.g., oxygen and/or fuel vapor) in the fuel vapor and air mixture.

Alternative methods for treating reactive components in accordance with the present invention include employing a reaction zone which comprises a source of microwave energy sufficient to deactivate said one or more reactive component(s) when contacted therewith.

As yet another alternative method for treating reactive components in accordance with the present invention, a reaction zone can be employed which comprises a source of plasma energy sufficient to deactivate said one or more reactive component(s) when contacted therewith.

Optionally, invention systems may further comprise a flame arrestor between the fuel storage tank and the fluid treatment zone (e.g., a water lock) so as to prevent any possibility of combustion to communicate between the fuel storage tank and the fluid treatment zone. Alternatively, the fluid treatment zone can be designed so as to prevent any flame formation.

Invention systems also include one or more sensors (e.g., oxygen sensors, chemical sensors, carbon dioxide sensors, nitrogen oxide ($NO_x$) sensors, and the like), which may be positioned upstream and/or downstream from the fluid treatment zone so as to monitor the levels of chemicals of interest (e.g., oxygen, hydrocarbons, $CO_2$, $NO_x$, and the like) in the inlet and/or outlet gas thereof. Invention systems further include a flow control element, which, depending on the results of the analysis provided by the sensor, either:

A. directs the flow of air directly into said container as fuel is withdrawn therefrom if the concentration of reactive component(s) in the air and/or the flow rate of air is such that introduction thereof into said container will not produce a concentration of reactive component(s) in said vapor phase fluid at which auto-ignition may occur when said vapor phase fluid is introduced into said container, or B. passes the air, in combination with vaporized fuel through the fluid treating zone under conditions suitable to produce reactive component-depleted air, which is thereafter optionally treated to remove any water from the reactive component-depleted air to produce substantially water-free, reactive component-depleted air, and finally introduced into the storage vessel as fuel is withdrawn therefrom.

Additionally, invention systems can include a feedback loop so as to adjust the contacting conditions within the fluid treatment zone as a function of the chemical levels detected before and/or after fluid is subjected to the reaction zone.

Thus, in one aspect of the present invention, sensors contemplated for use herein can be in fluid communication with the inlet of the fluid treating zone, and such sensors can be employed to control the passage of vapor through the fluid treating zone in response to the reactive species content thereof. For example, if the oxygen level of the vapor subject to treatment herein is below a target value, said vapor can be introduced directly into said container, without the need to pass through the fluid treating zone. Conversely, if the oxygen level of the vapor subject to treatment herein is above a target value, said vapor can be recycled through the fluid treating zone for further treatment before being introduced into said container.

As used herein, the term "upstream" refers to an element in a flow scheme which is located prior to or before a reference point or reference element. As used herein, the term "downstream" refers to an element in a flow scheme which is located after a reference point or reference element.

In certain embodiments of the invention, the system may also include a fluid purification module adapted to remove water from the treated air. For example, the fluid purification module may include a condenser to reduce the temperature of the treated vapor below the dew point, thereby facilitating removal of any excess water. In a particular embodiment, the fluid purification module may include a pressure swing adsorption module. In other embodiments, the purification module may include membranes. A recirculation line may be provided to transfer the fluid from the fluid purification module to the inlet to the reaction zone. The fluid purification module may be located upstream or downstream from the reaction zone. In other embodiments, water may be removed by a moisture trap (e.g. a physical trap, a desiccant, a scavenging agent, or the like).

As used herein, "purification" and "purifying" refer to the removal from a fluid of one or more components. The removal may be partial, complete or to a desired level and may include removal of only some or all components.

In one embodiment, the system may also include a recirculation line adapted to transfer the fluid from the separator to the inlet of the reaction zone.

In one embodiment, the system may also include a vapor trap adapted to separate vaporized liquid mixed with the fluid from the separator.

Invention systems may optionally further comprise an independent source of fuel to facilitate deactivation of the reactive components within the reaction zone. Additional optional elements which may be included in invention systems include an independent source of makeup air (in fluid communication with said container and/or said sensor). Still other optional elements which may be included in invention systems include an inlet for the introduction of fuel into said container.

In accordance with a further aspect of the present invention, there are provided systems for introducing reactive component-depleted air into a container having fuel therein as fuel is withdrawn therefrom. Invention systems comprise:
a fluid treating zone comprising:
at least one inlet,
at least one outlet,
a reaction zone, wherein said reaction zone provides conditions suitable to deactivate said one or more reactive component(s) when contacted therewith,
a source of air, wherein the source of air is in fluid communication with the inlet of the fluid treating zone,
a source of fuel, wherein the source of fuel is in fluid communication with the inlet of said fluid treating zone,
at least one sensor for
(a) analysis of the concentration of reactive component(s) in the source of air,
(b) analysis of the concentration of combustible material in the source of air, and/or
(c) analysis of the flow rate of the source of air,
a flow control element, and
optionally a filter/condenser, wherein when the filter/condenser is present, the fluid treating zone is in fluid communication with the inlet of the filter/condenser, and the outlet of the filter/condenser is in fluid communication with the container,
wherein:
the source of air is in fluid communication with said sensor;
the sensor is in fluid communication with said flow control element;
the flow control element is capable of controlling the rate of air flow through said system, and/or directing all or a portion of the air to the inlet of said fluid treating zone or all or a portion of the air directly into the container; and
the outlet of said fluid treating zone is in fluid communication with the container, and
said reaction zone provides conditions suitable to remove or reduce the concentration of reactive component(s) in the source of air when contacted therewith in the presence of fuel.

Systems as contemplated hereinabove are useful for a variety of applications, i.e., for filling the void created by withdrawal of fuel from a storage container with air which has been treated so as to substantially reduce the risk of ignition thereof.

In accordance with a still further aspect of the present invention, there are provided systems for displacing fuel in, or vapor in the vapor space of, a container having fuel therein with reactive component-depleted vapor (e.g., as fuel or fuel vapor from the vapor space thereof is withdrawn therefrom), Invention systems comprise:
a fluid treating zone comprising:
at least one inlet,
at least one outlet, and
a reaction zone, wherein said reaction zone provides conditions suitable to deactivate said one or more reactive component(s) when contacted therewith,
a source of air, wherein the source of air is in fluid communication with the inlet of the fluid treating zone,
a source of fuel, wherein the source of fuel is in fluid communication with the inlet of said fluid treating zone,
at least one sensor for
(a) analysis of the concentration of reactive component(s) in the source of air,
(b) analysis of the concentration of combustible material in the source of air, and/or
(c) analysis of the flow rate of the source of air,
a flow control element, and
optionally a filter/condenser, wherein when the filter/condenser is present, the fluid treating zone is in fluid communication with the inlet of the filter/condenser, and the outlet of the filter/condenser is in fluid communication with the container,
wherein:
the vapor space of said container is in fluid communication with said sensor;
the sensor is in fluid communication with said flow control element;
the flow control element is capable of controlling the rate of air flow through said system, and or directing all or a portion of the air to the inlet of said fluid treating zone or all or a portion of the air directly into the container;
the outlet of said fluid treating zone is in fluid communication with the container, and
said reaction zone provides conditions suitable to remove or reduce the concentration of reactive component(s) in the source of air when contacted therewith in the presence of fuel.

Systems as contemplated hereinabove are useful for a variety of applications, i.e., for filling the void created by withdrawal of fuel from a storage container with air which has been treated so as to substantially reduce the risk of ignition thereof.

In accordance with yet another aspect of the present invention, there are provided systems for determining whether treatment is required of a vapor phase fluid which potentially contains one or more reactive component(s) therein prior to introduction thereof into a container having fuel therein, and if such treatment is required, reducing the concentration of said one or more reactive component(s) in said vapor phase fluid prior to introduction thereof into said container sufficiently so as to reduce the concentration of reactive component(s) in said vapor phase fluid below the concentration at which auto-ignition may occur when said vapor phase fluid is introduced into said container. Invention systems comprise:

the container,
a source of vapor phase fluid,
at least one sensor for
(a) analysis of the concentration of reactive component(s) in said vapor phase fluid,
(b) analysis of the concentration of combustible material in said vapor phase fluid, and/or
(c) analysis of the flow rate of said vapor phase fluid,
a flow control element, and
a fluid treating zone comprising:
at least one inlet,
at least one outlet, and
a catalyst zone, said catalyst zone comprising an optionally supported catalyst, said catalyst being reactive with one or more reactive component(s) when contacted therewith under suitable conditions so as to deactivate said one or more reactive component(s),
wherein:
said source of vapor phase fluid is in fluid communication with said sensor;
the sensor is in fluid communication with said flow control element;
the flow control element is capable of controlling the rate of flow of the vapor phase fluid through said system, and/or directing all or a portion of the fluid to the inlet of said fluid treating zone or all or a portion of the fluid directly into the container; and
the outlet of said fluid treating zone is in fluid communication with the container, and
only the outlet of said fluid control element, or said fluid treating zone is in fluid communication with the container, such that the inlet of said fluid treating zone has no communication with the container or contents thereof.

Systems as contemplated hereinabove are useful for a variety of applications, i.e., for filling the void created by withdrawal of fuel from a storage container with air which has been treated so as to substantially reduce the risk of ignition thereof.

In accordance with still another aspect of the present invention, there are provided fuel storage systems for use in aircraft. Invention systems comprise:

a container having an outlet for removal of vapor phase fluid therefrom, and an inlet for return of vapor phase fluid thereto,
at least one sensor for
(a) analysis of the concentration of reactive component(s) in said vapor phase fluid,
(b) analysis of the concentration of combustible material in said vapor phase fluid, and/or
(c) analysis of the flow rate of said vapor phase fluid,
a flow control element, and
a reaction zone which provides conditions suitable to deactivate one or more reactive component(s) in the vapor phase of said container when contacted therewith,
wherein:
the vapor space of said container is in fluid communication with said sensor;
the sensor is in fluid communication with said flow control element;
the flow control element is capable of controlling the rate of flow of the vapor phase fluid through said system, and/or directing all or a portion of the fluid to the inlet of said fluid treating zone or all or a portion of the fluid back into the container; and
the outlet of said fluid treating zone is in fluid communication with the container.

Systems as contemplated hereinabove are useful for a variety of applications, i.e., for filling the void created by withdrawal of fuel from a storage container with air which has been treated so as to substantially reduce the risk of ignition thereof.

In accordance with still another aspect of the present invention, there are provided methods for displacing fuel in, or vapor in the vapor space of, a container having fuel therein with reactive component-depleted air as fuel is withdrawn from the container. Invention methods comprise:

contacting a source of air with a sensor for
(a) analysis of the concentration of reactive component(s) in the source of air,
(b) analysis of the concentration of combustible material in the source of air, and/or
(c) analysis of the flow rate of the source of air,
passing the air through a flow control element, which, depending on the results of the analysis provided by said sensor, either:
A. directs the flow of air directly into said container as fuel is withdrawn therefrom if the concentration of reactive component(s) in the air and/or the flow rate of air is such that introduction thereof into said container will not produce a concentration of reactive component(s) in said vapor phase fluid at which auto-ignition may occur when said vapor phase fluid is introduced into said container, or
B. passes the air, in combination with vaporized fuel through a fluid treating zone under conditions suitable to produce reactive component-depleted air,
optionally removing any water from the reactive component-depleted air to produce substantially water-free, reactive component-depleted air, and
introducing the resulting substantially water-free, reactive component-depleted air into said container as fuel is withdrawn therefrom.

Methods as contemplated hereinabove are useful for a variety of applications, i.e., for filling the void created by withdrawal of fuel from a storage container with air which has been treated so as to substantially reduce the risk of ignition thereof.

In accordance with still another aspect of the present invention, there are provided methods for reducing the concentration of one or more reactive component(s) from the vapor phase of a fuel storage tank (e.g., by deactivation of the reactive component(s) therein), wherein said fuel storage tank is provided with outlet for removal of vapor therefrom and inlet for return of vapor thereto. Invention methods comprise:

passing at least a portion of the vapor phase from the fuel storage tank through a reaction zone, wherein said reaction zone provides conditions suitable to deactivate said one or more reactive component(s) when contacted therewith, thereby producing a vapor phase having reduced concentration of reactive component(s) therein, and thereafter
returning the vapor phase having reduced concentration of reactive component(s) therein to said fuel storage tank.

Methods as contemplated hereinabove are useful for a variety of applications, i.e., for filling the void created by withdrawal of fuel from a storage container with air which has been treated so as to substantially reduce the risk of ignition thereof.

In accordance with yet another aspect of the present invention, there are provided methods for displacing fuel in, or vapors in the vapor space of, a fuel storage vessel with reactive component-depleted vapor (e.g., as fuel or fuel vapor from the vapor space thereof is withdrawn therefrom). Invention methods comprise:

combining air with vaporized fuel,
passing the resulting combination through a reaction zone under conditions suitable to produce reactive component-depleted vapor,
optionally removing any water from the reactive component-depleted vapor to produce substantially water-free, reactive component-depleted vapor, and
introducing the resulting substantially water-free, reactive component-depleted vapor into said fuel storage vessel.

Methods as contemplated hereinabove are useful for a variety of applications, i.e., for filling the void created by withdrawal of fuel from a storage container with air which has been treated so as to substantially reduce the risk of ignition thereof.

Additional methods contemplated herein for displacing fuel in, or vapors in the vapor space of, a fuel storage vessel with reactive component-depleted vapor (e.g., as fuel or fuel vapor from the vapor space thereof is withdrawn therefrom) comprise:

contacting a combination of air and vaporized fuel in a reaction zone under conditions suitable to produce reactive component-depleted air,
optionally removing any water from the reactive component-depleted air to produce substantially water-free, reactive component-depleted air,
introducing the resulting substantially water-free, reactive component-depleted air into said fuel storage vessel.

Methods as contemplated hereinabove are useful for a variety of applications, i.e., for filling the void created by withdrawal of fuel from a storage container with air which has been treated so as to substantially reduce the risk of ignition thereof.

Additional methods contemplated herein for displacing fuel in, or vapors in the vapor space of, a fuel storage vessel with reactive component-depleted vapor comprise introducing treated vapor into said fuel storage vessel as fuel or fuel vapor from the vapor space thereof is withdrawn therefrom, wherein said treated vapor is prepared by passing a combination of air and vaporized fuel through a reaction zone under conditions suitable to produce reactive component-depleted air, and optionally removing any water from the reactive component-depleted air.

Methods as contemplated hereinabove are useful for a variety of applications, i.e., for filling the void created by withdrawal of fuel from a storage container with air which has been treated so as to substantially reduce the risk of ignition thereof.

The invention will now be described in greater detail with reference to the Figures, which are illustrative of various embodiments of the invention. White the exemplary embodiments illustrated in the Figures and described herein are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

FIG. 1 is a schematic illustration of one embodiment of the present invention. Vapor from fuel-containing vessel 102 is transported into the fluid treating zone 103 via line 104, and contacted with sensor 107. Once analyzed by sensor 107, vapor is passed to flow control element 108 which directs further vapor flow either back to fuel-containing vessel 102 via line 110 (if the impurity level therein is sufficiently low), or through reaction zone 106 for treatment to reduce the content of impurities therein. After treatment in reaction zone 106, reactive-component depleted air is returned to fuel-containing vessel 102 via line 105. Inerted vapor is prepared in fluid treating zone 103 by introducing vapor from fuel-containing vessel 102 into reaction zone 106. Reaction zone 106 may optionally also be supplied with supplemental air, as needed, via line 109.

Figure 2:
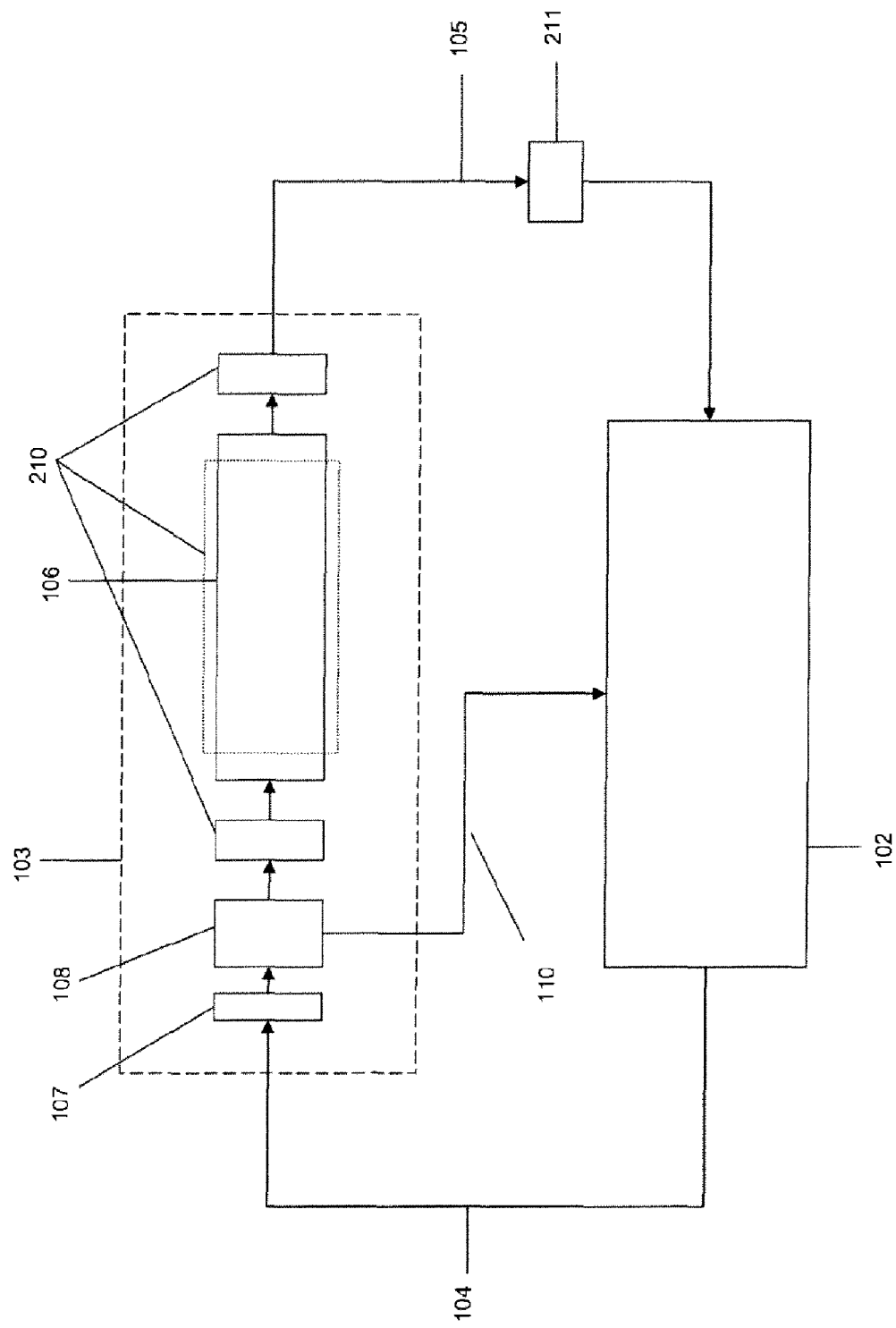
FIG. 2 is a schematic illustration of another embodiment of a reactive component reduction system according to the invention.

FIG. 2 is a schematic illustration of another embodiment of the present invention, which is a variant of the embodiment illustrated in FIG. 1. Thus, in FIG. 2 fluid treating zone 103 is provided with one or more temperature modulators 210, e.g., before reaction zone 106, after reaction zone 106, or intimately associated with reaction zone 106. Additional temperature modulation can be provided for treatment of vapors before returning treated vapor to the fuel-containing vessel 102 (e.g., temperature modulator 211).

Figure 3:
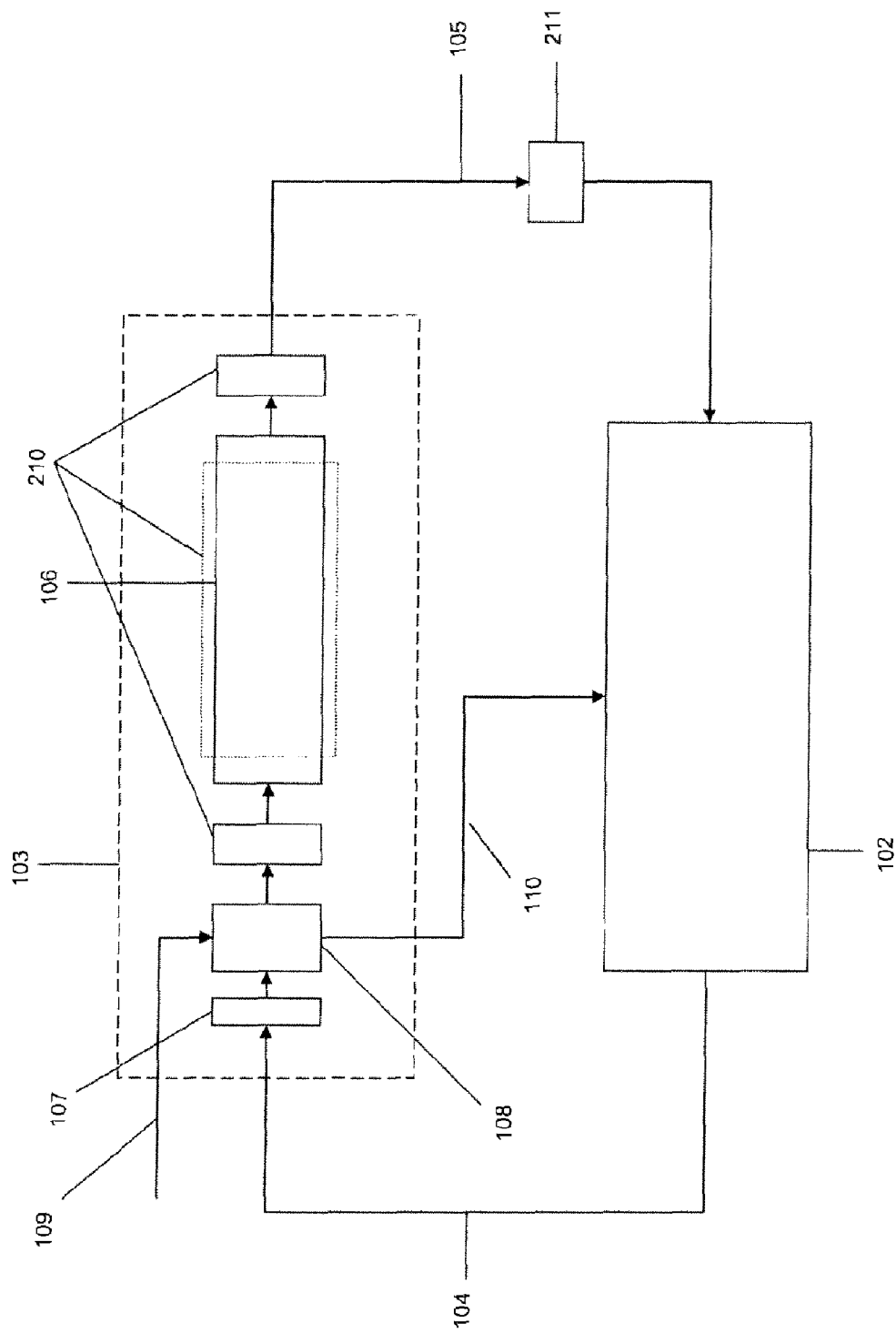
FIG. 3 is a schematic illustration of yet another embodiment of a reactive component reduction system according to the invention.

FIG. 3 is a schematic illustration of another embodiment of the invention reactive component reduction systems shown in FIGS. 1 and 2, wherein supplemental air is provided, as needed, via line 109, and one or more temperature modulators 210 and/or one or more temperature modulators 211 are also provided.

Figure 4:
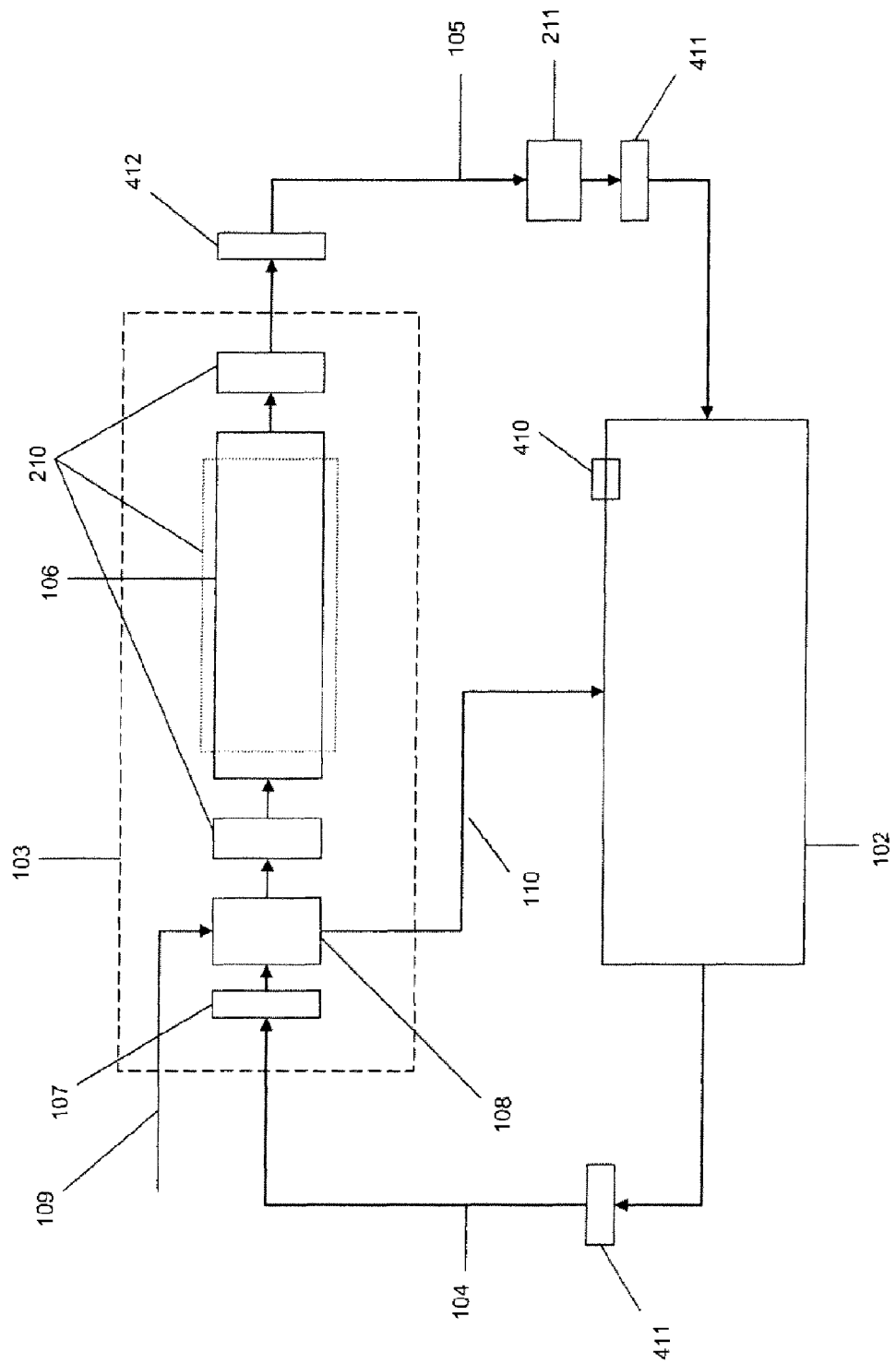
FIG. 4 is a schematic illustration of still another embodiment of a reactive component reduction system according to the invention.

FIG. 4 is a schematic illustration of yet another embodiment of a reactive component reduction system according to the invention, further provided with one or more flame arrestors 411, and/or one or more container vent/pressure equilibrating element 410, and/or one or more post-treatment sensors 412, which sensor(s) facilitate monitoring the content of reactive material(s) in the fluids which have passed through reaction zone 106.

Figure 5:
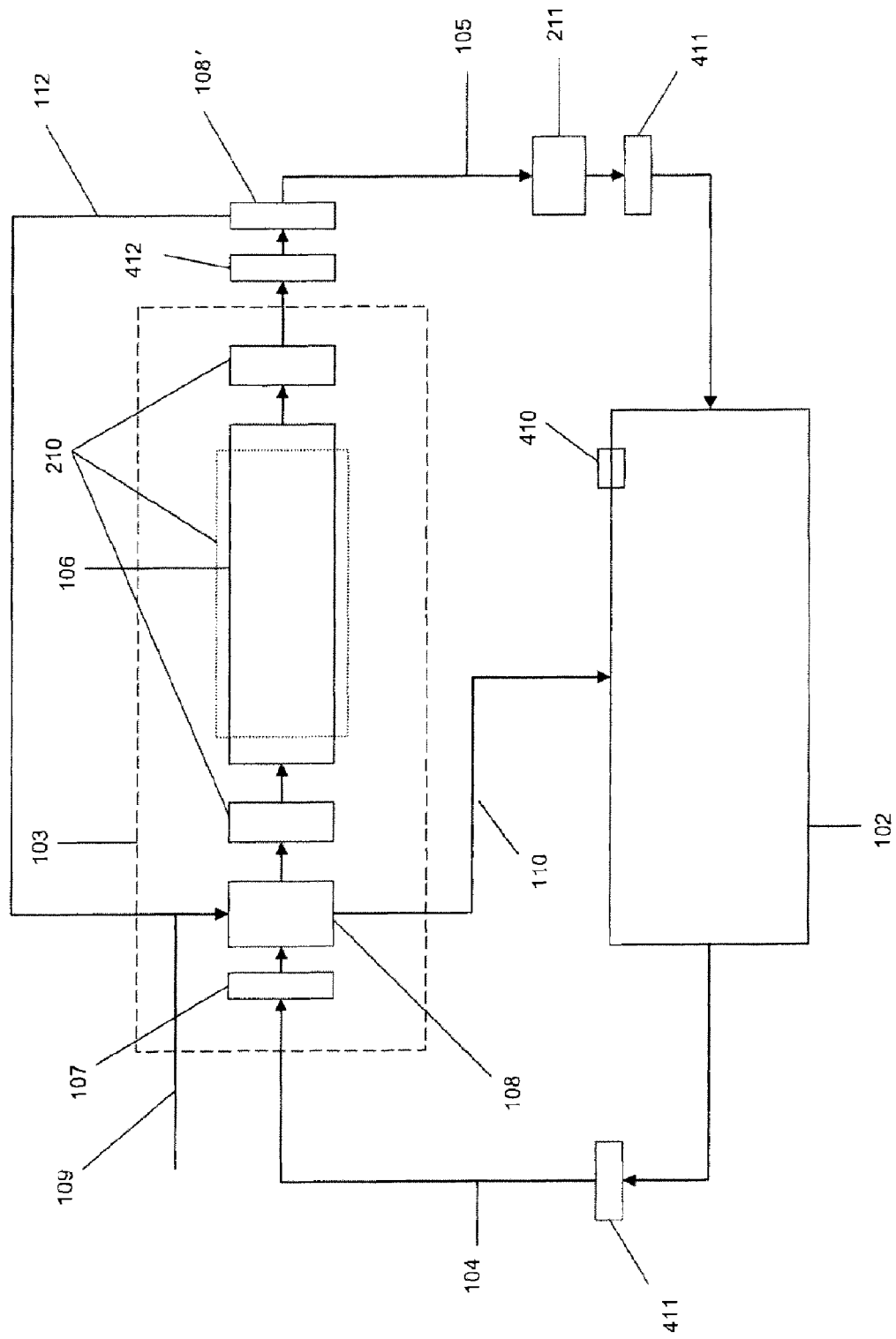
FIG. 5 is a schematic illustration of a further embodiment of a reactive component reduction system according to the invention.

FIG. 5 is a schematic illustration of another embodiment of a reactive component reduction system according to the invention as shown in FIG. 4, further comprising an additional flow control element 108' in fluid communication with post-treatment sensor(s) 412, which facilitates recycle of vapor, via line 112, back to fluid treating zone 103 as appropriate, depending on the efficacy of the prior pass of vapor through fluid treating zone 103.

Figure 6A:
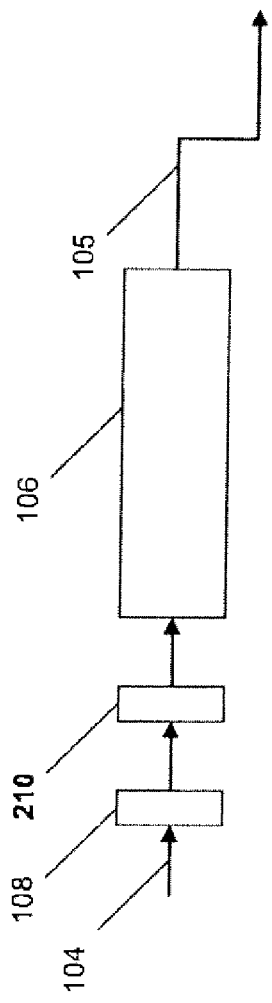
FIGS. 6A-6C are schematic illustrations of exemplary methods for imparting temperature modulation to reactive component reduction systems according to the invention.
Figure 6B:
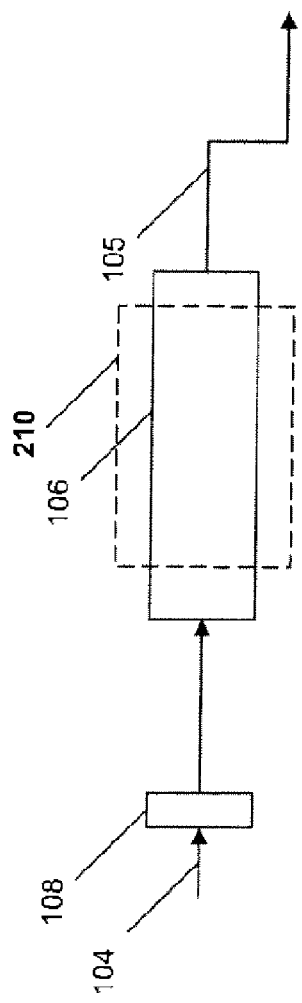
Figure 6C:
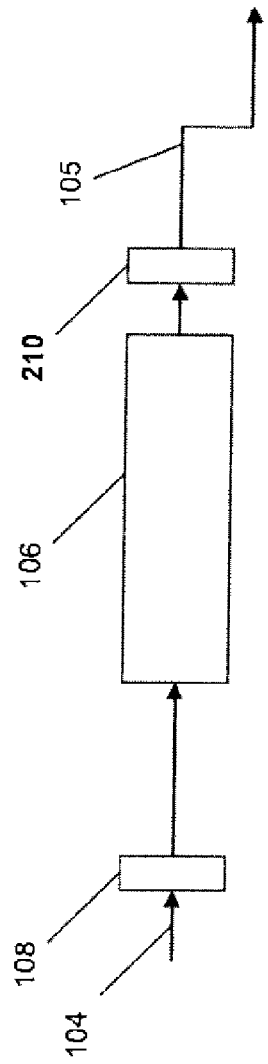

FIGS. 6A-6C are schematic illustrations of various configurations by which temperature modulation can be incorporated into fluid treating zone 103. Thus, FIG. 6A illustrates an embodiment wherein one or more temperature modulators 210 are positioned upstream of reaction zone 106, while FIG. 6B illustrates an embodiment wherein one or more temperature modulators 210 are intimately associated with reaction zone 106, and FIG. 6C illustrates an embodiment wherein one or more temperature modulators 210 are positioned downstream of reaction zone 106. As readily recognized by those of skill in the art, any combination of temperature modulators can be used in the practice of the present invention.

Figure 7:
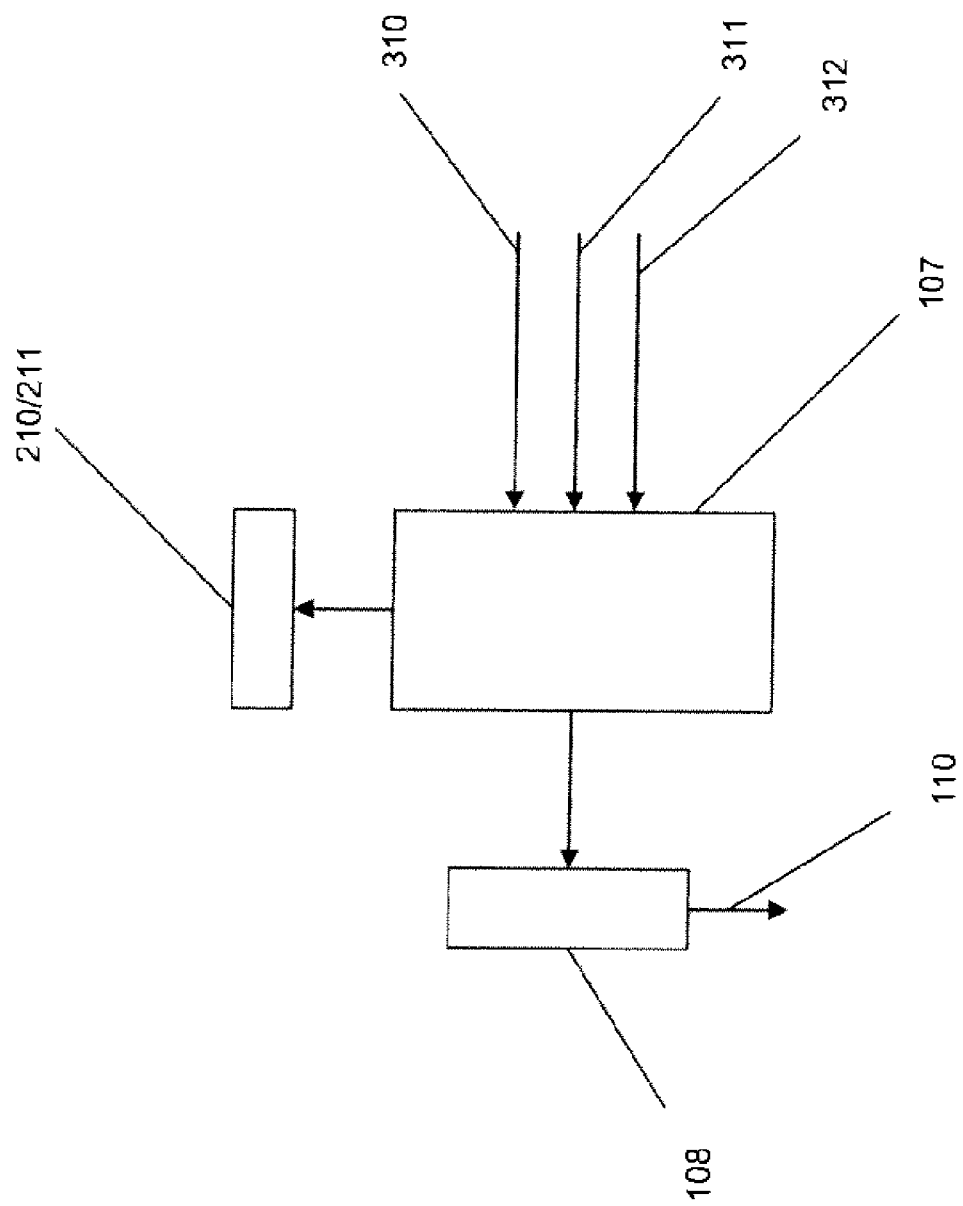
FIG. 7 is a schematic illustration of an exemplary sensor assembly suitable for use in reactive component reduction systems according to the invention.

FIG. 7 is a schematic illustration of an exemplary sensor assembly contemplated for use in the reactive component reduction system of the invention. Thus, sensor 107 can comprise one or more of an oxygen sensor 310, a chemical sensor 311, and/or a flow sensor 312. Based on the information provided by the various sensors, flow control element 108 which will direct the flow of vapor back to the fuel-containing vessel 102 via line 110, or on to the reaction zone 106, optionally through temperature modulators 210/211.

Figure 8:
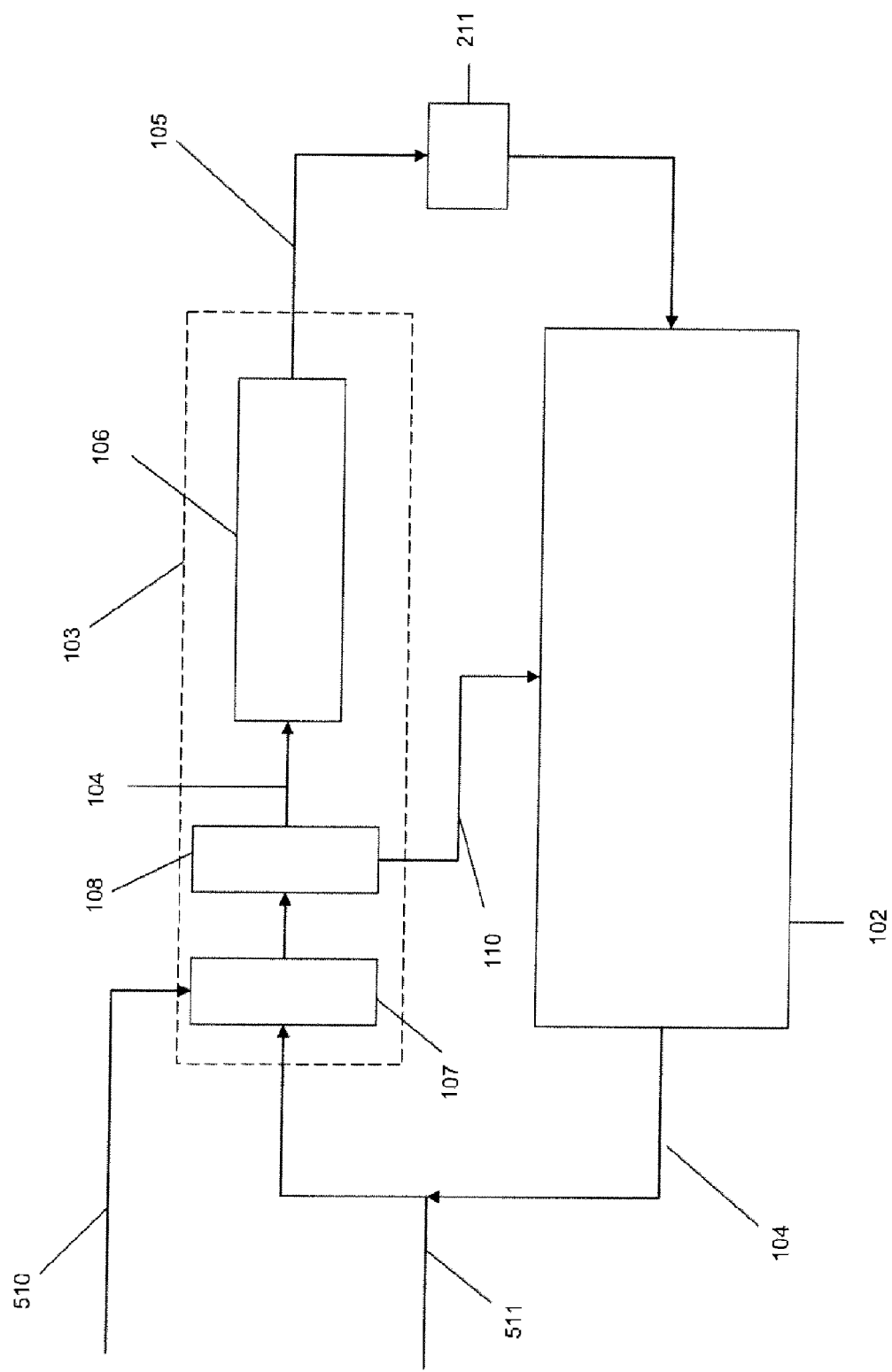
FIG. 8 is a schematic illustration of yet another embodiment of a reactive component reduction system according to the invention.

FIG. 8 is a schematic illustration of still another embodiment of a reactive component reduction system according to the invention, representing one of the possible combinations of features contemplated for use in the practice of the present invention. Specifically illustrated in this Figure is the provision of an auxiliary source of air (510) and an auxiliary source of fuel (511), wherein the auxiliary source of fuel is mixed with the vapor withdrawn from fuel-containing vessel 102 prior to contacting with sensor 107.

Figure 9:
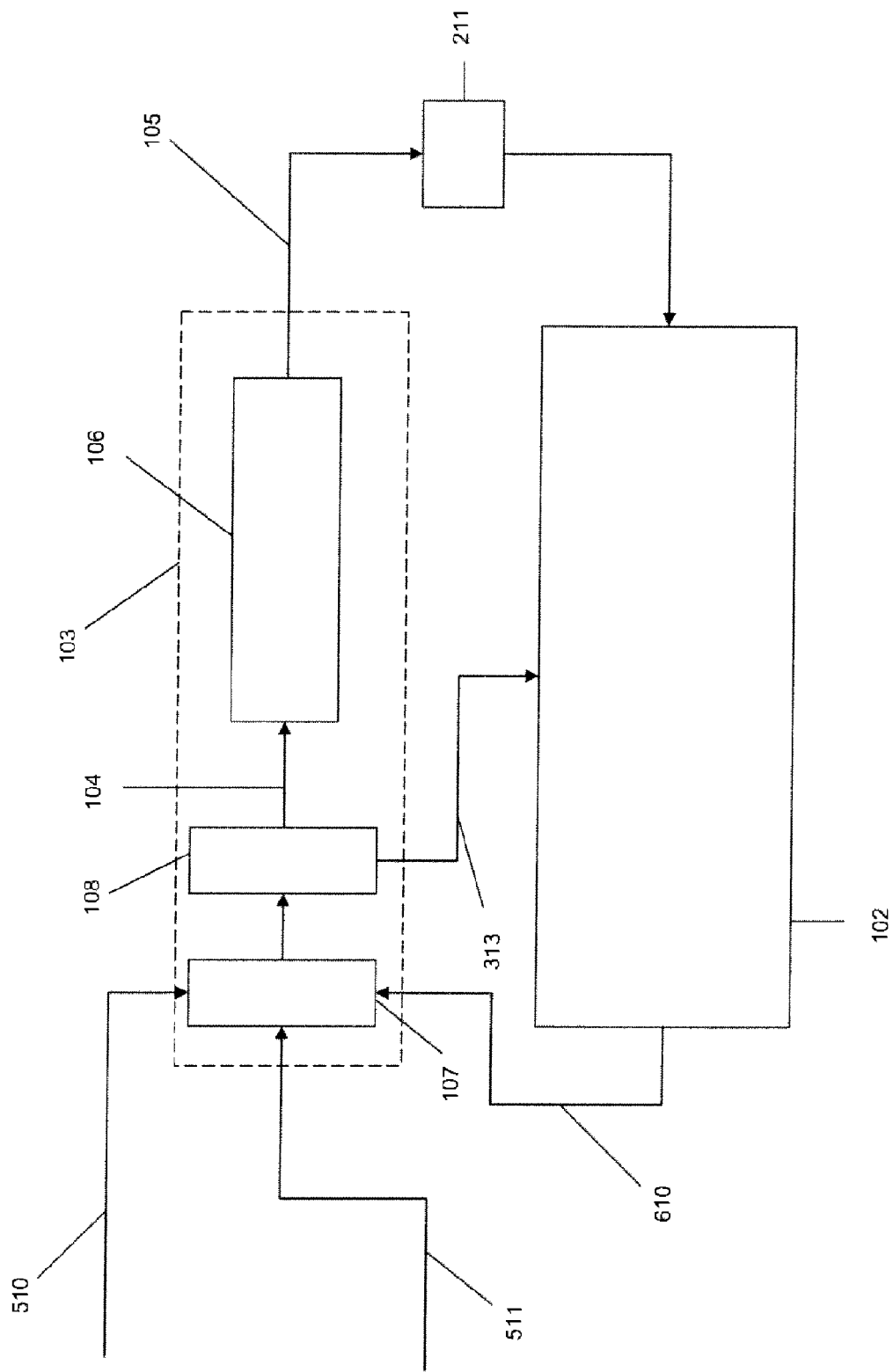
FIG. 9 is a schematic illustration of a further embodiment of a reactive component reduction system according to the invention.

FIG. 9 is a schematic illustration of a variation of the embodiment of a reactive component reduction system according to the invention shown in FIG. 8, wherein the auxiliary source of fuel (511) is contacted with sensor 107 separately from the vapor that is withdrawn from fuel-containing vessel 102 via line 610.

Figure 10:
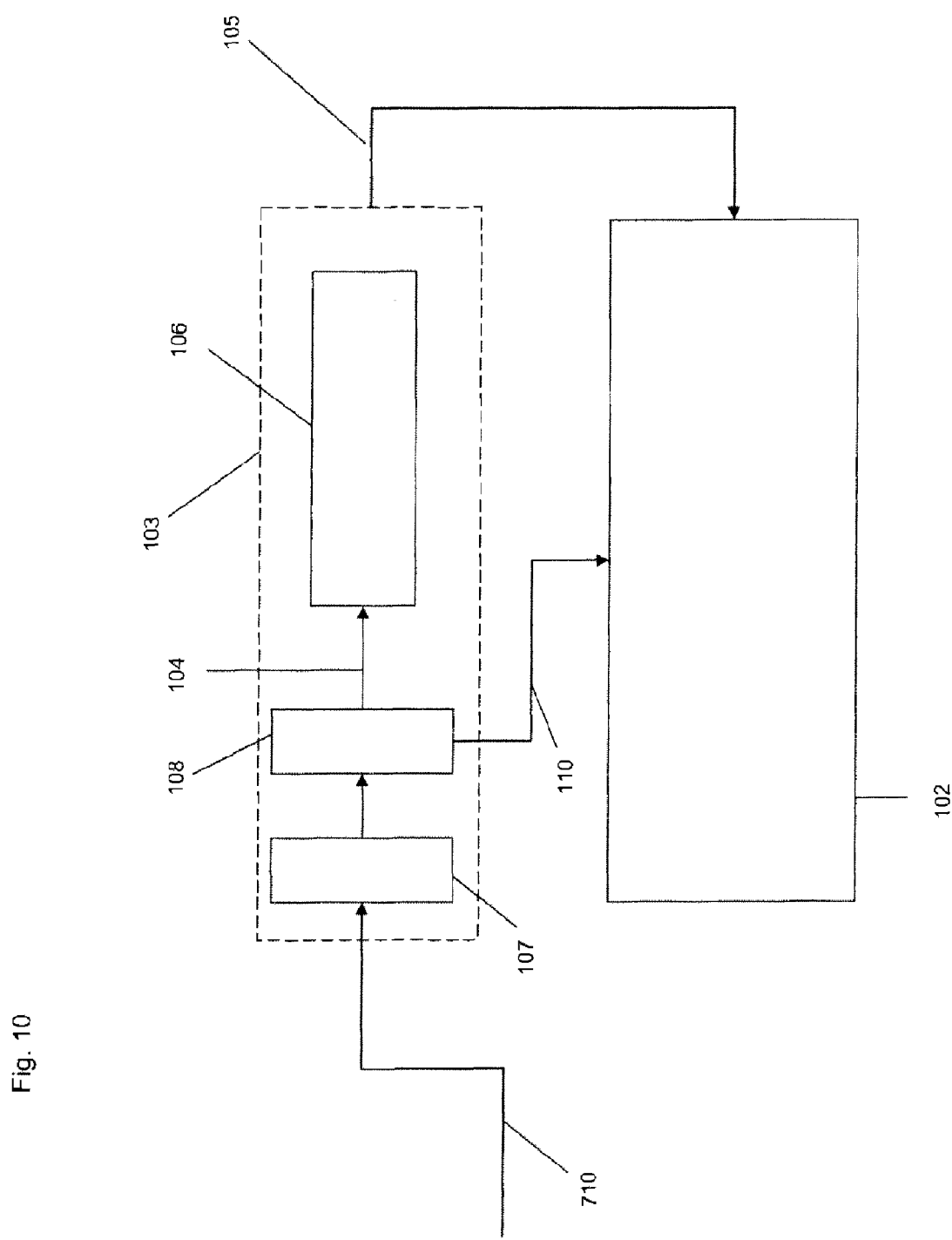
FIG. 10 is a schematic illustration of a further embodiment of a reactive component reduction system according to the invention.

FIG. 10 is a schematic illustration of yet another embodiment of a reactive component reduction system according to the invention, wherein a separate vapor phase fluid source (containing both air and fuel) are contacted directly with sensor 107 via line 710.

Figure 11:
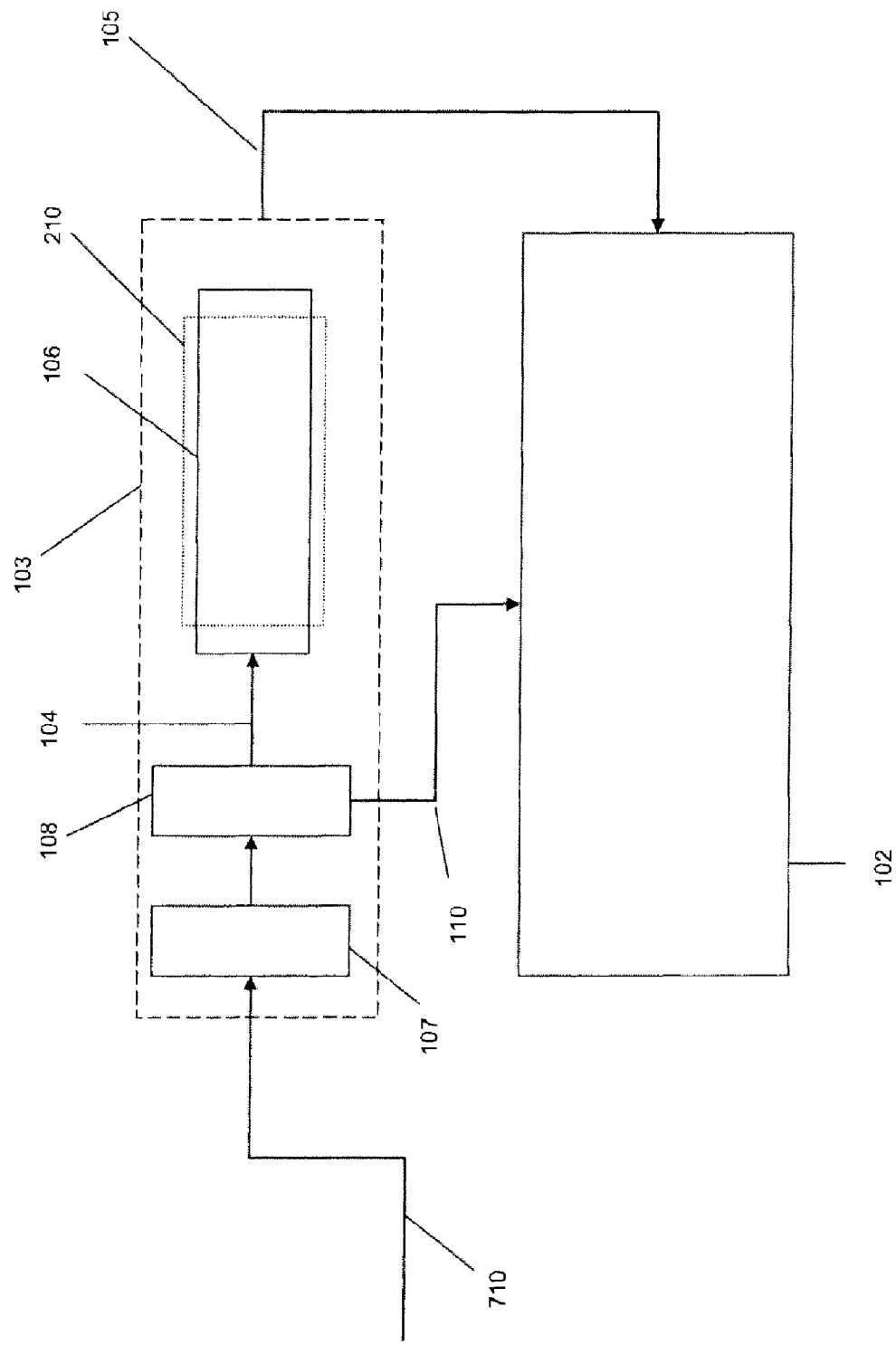
FIG. 11 is a schematic illustration of a further embodiment of a reactive component reduction system according to the invention.

FIG. 11 is a schematic illustration of still another embodiment of a reactive component reduction system according to the invention, wherein the embodiment illustrated in FIG. 10 is further equipped with one or more temperature modulators 210.

Figure 12:
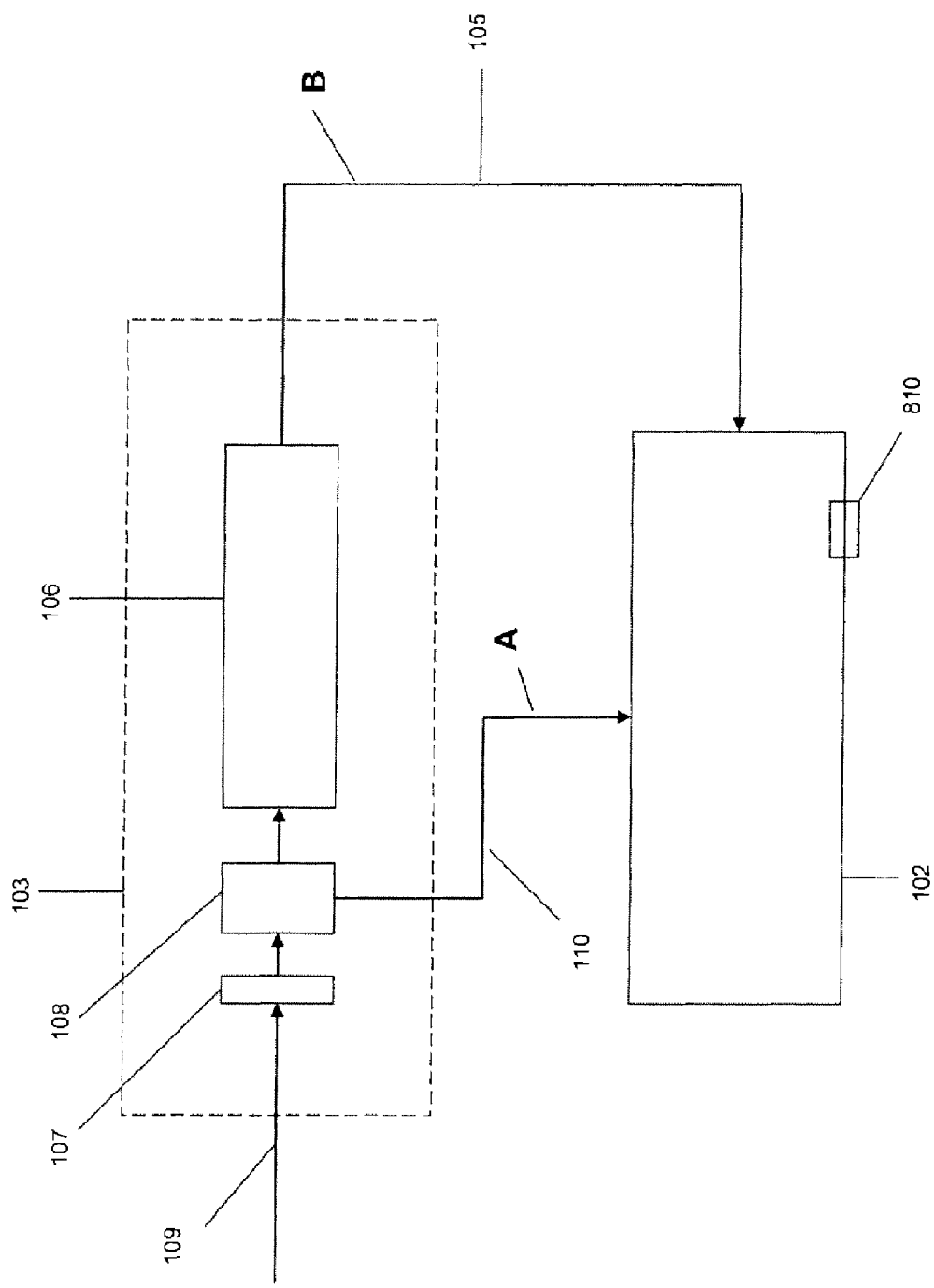
FIG. 12 is a schematic illustration of a further embodiment of a reactive component reduction system according to the invention.

FIG. 12 is a schematic illustration of an embodiment of the use of reactive component reduction systems according to the invention, wherein air is passed directly back into fuel-containing vessel 102 (via pathway "A") if the concentration of reactive component(s) in the air and/or the flow rate of air is such that introduction thereof into said container will not produce a concentration of reactive component(s) in said vapor phase fluid at which auto-ignition may occur when said vapor phase fluid is introduced into said container, or flow control element 108 will pass the air, in combination with vaporized fuel through fluid treating zone 106 under conditions suitable to produce reactive component-depleted air. This Figure also illustrates the presence of a fuel withdrawal port 810, from which fuel can be withdrawn. As readily recognized by those of skill in the art, any of the other embodiments contemplated herein could also include a feature comparable to fuel withdrawal port 810 illustrated herein.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

That which is claimed is:

1. A system for reducing the concentration of one or more reactive component(s) in the vapor space of a container having combustible material therein, thereby reducing the concentration of reactive component(s) in said vapor space below the concentration at which auto-ignition may occur, said system comprising:
said container,
a fluid treating zone comprising:
at least one inlet,
at least one outlet, and
a reaction zone, wherein said reaction zone provides conditions suitable to deactivate said one or more reactive component(s) when contacted therewith,
at least one sensor for
(a) analysis of the concentration of reactive component(s) in the vapor phase,
(b) analysis of the concentration of combustible material in the vapor phase, and/or
(c) analysis of the flow rate of the vapor phase, and
a flow control element,
wherein:
the vapor space of said container is in fluid communication with said sensor;
the sensor is in fluid communication with said flow control element;
the flow control element is capable of controlling the flow rate of the vapor phase through said system, and/or directing all or a portion of the fluid to the inlet of said fluid treating zone or all or a portion of the fluid back into the container; and
the outlet of said fluid treating zone is in fluid communication with the container.

2. The system of claim 1 wherein said fluid treating zone comprises a catalyst which is reactive with said one or more reactive component(s) when contacted therewith under suitable conditions.

3. The system of claim 2 wherein said catalyst is contained within a vessel.

4. The system of claim 3 wherein the vessel has an inlet end and an outlet end, and the catalyst content varies from the inlet end to the outlet end.

5. The system of claim 4 wherein the catalyst content varies non-linearly from the inlet end to the outlet end.

6. The system of claim 5 wherein the catalyst content increases from the inlet end to the outlet end.

7. The system of claim 5 wherein the catalyst content decreases from the inlet end to the outlet end.

8. The system of claim 2 wherein said catalyst is an optionally supported catalyst.

9. The system of claim 8 wherein said catalyst is selected from the group consisting of noble metals, precious metals, transition metal oxides, rare earth oxides, and mixtures of any two or more thereof.

10. The system of claim 2 wherein said suitable conditions for contacting said catalyst with said one or more reactive component(s) comprise a temperature in the range of about 25° C. up to about 1200° C.

11. The system of claim 2 wherein the reaction zone is associated with a temperature modulator.

12. The system of claim 11 wherein said temperature modulator is a heat exchanger.

13. The system of claim 12 wherein the heat exchanger is integrated with the catalyst containing vessel.

14. The system of claim 12 wherein said heat exchanger comprises a heat exchange medium.

15. The system of claim 14 wherein the heat exchange medium is selected from external air or a liquid.

16. The system of claim 12 wherein said heat exchanger is a heat pump.

17. The system of claim 11 wherein said temperature modulator is an evaporative cooler.

18. The system of claim 1 wherein said reaction zone comprises a source of microwave energy sufficient to deactivate said one or more reactive component(s) when contacted therewith.

19. The system of claim 1 wherein said reaction zone comprises a source of plasma energy sufficient to deactivate said one or more reactive component(s) when contacted therewith.

20. The system of claim 1 wherein at least one sensor is an oxygen sensor.

21. The system of claim 1 wherein at least one sensor is a chemical sensor.

22. The system of claim 1, wherein said flow control element controls, based on the level of reactive component(s) in said vapor phase, the flow rate of the vapor phase through said fluid treating zone.

23. The system of claim 1, wherein said flow control element controls, based on the level of reactive component(s) in said vapor phase, whether all or a portion of the vapor phase is directed through said fluid treating zone or all or a portion of the vapor phase is returned to said container without passing through the fluid treating zone.

24. The system of claim 1 wherein said fluid treating zone is external to said container.

25. The system of claim 24, further comprising one or more heat exchangers upstream and/or downstream of said fluid treating zone.

26. The system of claim 1 wherein said fluid treating zone is within said container.

27. The system of claim 1 further comprising one or more elements suitable for equilibrating pressure within the system upon exposure to sub- or super-atmospheric conditions.

28. The system of claim 27, wherein said one or more elements suitable for equilibrating pressure within the system comprises a source of make-up fluid to equilibrate pressure within the system upon exposure to sub-atmospheric conditions.

29. The system of claim 27, wherein said one or more elements suitable for equilibrating pressure within the system comprises a vent to equilibrate pressure within the system upon exposure to super-atmospheric conditions.

30. The system of claim 27, wherein said container comprises one or more flexible members, thereby providing one or more elements suitable for equilibrating pressure within the system.

31. The system of claim 1 wherein said reactive component(s) is oxygen.

32. The system of claim 1 wherein said vapor phase further comprises fuel vapor.

33. The system of claim 1 further comprising an independent source of fuel to facilitate deactivation of the reactive components within the reaction zone.

34. The system of claim 1 further comprising an independent source of makeup air in fluid communication with said container and/or said sensor.

35. The system of claim 1 further comprising an inlet for the introduction of fuel into said container.

36. The system of claim 1 wherein said container is provided with an outlet for removal of fuel therefrom and/or vapor phase from the vapor space thereof, and an inlet for introduction of vapor thereto.

37. The system of claim 36 further comprising a flame arrestor.

38. The system of claim 37 wherein said flame arrestor is positioned in the inlet and/or outlet of the container.

39. The system of claim 1 further comprising one or more sensors after the fluid treating zone.

40. The system of claim 39 wherein at least one sensor is an oxygen sensor.

41. The system of claim 40 wherein said oxygen sensor is in fluid communication with the outlet of the fluid treating zone.

42. The system of claim 41 further comprising a flow control element which directs all or a portion of the vapor phase back to the container, or back through said fluid treating zone in response to the oxygen content thereof.

43. The system of claim 39 wherein at least one sensor is a chemical sensor.

44. The system of claim 1 further comprising an element for the removal of water from the vapor phase wherein said element is positioned downstream from the fluid treating zone.

* * * * *